Figure 2:
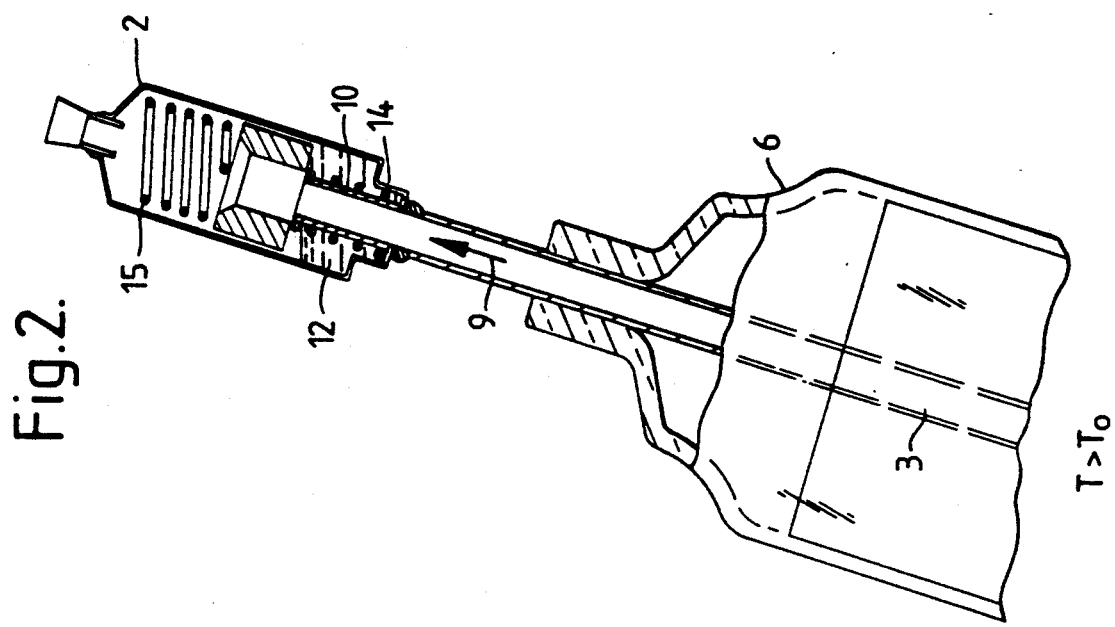

United States Patent

Mahdjuri-Sabet

[11] Patent Number: 5,241,950
[45] Date of Patent: Sep. 7, 1993

[54] HEAT PIPE DEVICE

[76] Inventor: Faramarz Mahdjuri-Sabet, Thermomax Limited, Balloo Crescent, Bangor BT19 2UP, United Kingdom

[21] Appl. No.: 820,670
[22] PCT Filed: May 20, 1991
[86] PCT No.: PCT/GB91/00787
 § 371 Date: Jan. 16, 1992
 § 102(e) Date: Jan. 16, 1992
[87] PCT Pub. No.: WO91/18252
 PCT Pub. Date: Nov. 28, 1991

[30] Foreign Application Priority Data

May 19, 1990 [GB] United Kingdom ............... 9011261

[51] Int. Cl.⁵ ............................. F24J 2/40; F24J 2/32
[52] U.S. Cl. ............................. 126/589; 126/599; 165/32
[58] Field of Search ............... 165/32, 96; 126/635, 126/636, 637, 589, 599

[56] References Cited

U.S. PATENT DOCUMENTS 1,705,550  3/1929  Vernet ................... 165/32
4,305,382  12/1981 Nott .................... 126/636
4,941,526  7/1990  Nilsson ................. 165/32

Primary Examiner—Albert W. Davis, Jr.
Attorney, Agent, or Firm—Watson, Cole, Grindle & Watson

[57] ABSTRACT

A heat pipe containing a working fluid, comprises an evaporator, a condenser, an interconnecting tube joining the evaporator and the condenser, and a regulating means for limiting the maximum temperature in the condenser to a predetermined temperature. The regulating means comprises a plug operable by means of a temperature sensitive member to move between a first position in which the plug seats in a fluid reservoir in the condenser and a second position in which the reservoir is adapted to collect the working fluid.

11 Claims, 1 Drawing Sheet

HEAT PIPE DEVICE

This invention relates in general to a heat pipe device, and in particular to such a device for use in solar radiation collectors.

A heat pipe transfers and distributes heat by vaporisation and condensation of a working fluid which is employed as a heat transfer medium. A principal feature of a heat pipe is that the energy required for the flow of the liquid and the vapour in the device, in the presence of gravity, is completely provided by the heat source, so that no external pumping means is needed.

Solar radiation collectors are intended to convert solar radiation into heat in the working fluid and to transfer the heat, with the maximum possible efficiency, to a secondary heat transfer fluid, which may be water or air, for example. The use of heat pipes in solar collectors is already known from my British Patent number 2023804 and from my British Patent application number 2023803, for example.

A heat pipe conventionally comprises an evaporator element and a condenser element interconnected by means of a conduit, the condenser being placed in use above the evaporator. When the device is cool the working fluid collects in the base of the evaporator. When heat is supplied to the evaporator the working fluid begins to vaporise and moves up into the condenser, where the heat is removed from the vapour, the vapour then condenses and falls back into the evaporator under the force of gravity.

If, however, heat is not removed from the condenser, or it is not removed at a high enough rate, the condenser will overheat and the device may be damaged. Safety measures therefore have to be included in the device to prevent this. It is desirable to devise a means whereby the maximum temperature of the condenser may be limited to a chosen temperature $T_o$. This can be achieved if the working fluid is collected in the condenser compartment when the condenser reaches the limiting temperature $T_o$, rather than allowing the fluid to return to the evaporator. As a consequence, if heat continues to be applied to the evaporator, it gradually dries out and all the working fluid is held in the condenser, so that heat transfer between the evaporator and the condenser is interrupted.

International Patent Application number WO87/07003 describes a heat pipe in which, during normal operation, the condensed working fluid is drained or diverted back into the evaporator to continue the cycle of heat transfer, but if the condenser temperature goes above $T_o$, regulating means are provided for collecting the condensed working fluid in a chamber whereby the fluid cannot return to the evaporator. The regulating means comprises a valve controlled by a means made from a shape memory alloy, the alloy being arranged to alter its shape when it reaches the limiting temperature $T_o$.

The regulating means of WO87/07003 requires a relatively large force to operate the valve in order to guarantee a proper seal when the valve is in its closed position. Furthermore, the valve needs to be precisely machined and fitted to ensure a good seal, and the sealing surfaces may be susceptible to damage during use. Thus a heat pipe employing this regulating means is difficult and expensive to produce.

According to the present invention there is provided a heat pipe containing a working fluid, the heat pipe comprising an evaporator, a condenser, an interconnecting tube joining the evaporator and the condenser, and a regulating means for limiting the maximum temperature in the condenser to a predetermined temperature, the regulating means comprising a plug operable by means of a temperature sensitive member to move between a first position in which the plug seats in a fluid reservoir in the condenser and a second position in which the reservoir is adapted to collect the working fluid.

Preferably the fluid reservoir is formed by means of an overflow pipe which extends into the condenser from the base of the condenser. The plug may then be an annular member adapted to fit slidingly over the overflow pipe.

The temperature sensitive member is preferably made from a bimetal or a shape memory alloy, and may be in the form of a helical spring which acts on the plug. An additional helical spring may be provided to reposition the plug to its first position when the temperature sensitive member reverts to its original setting.

The heat pipe of the present invention is preferably used in a solar radiation collector having an absorption apparatus fitted around the evaporator and a secondary fluid circuit for removing the heat from the condenser.

Figure 1:
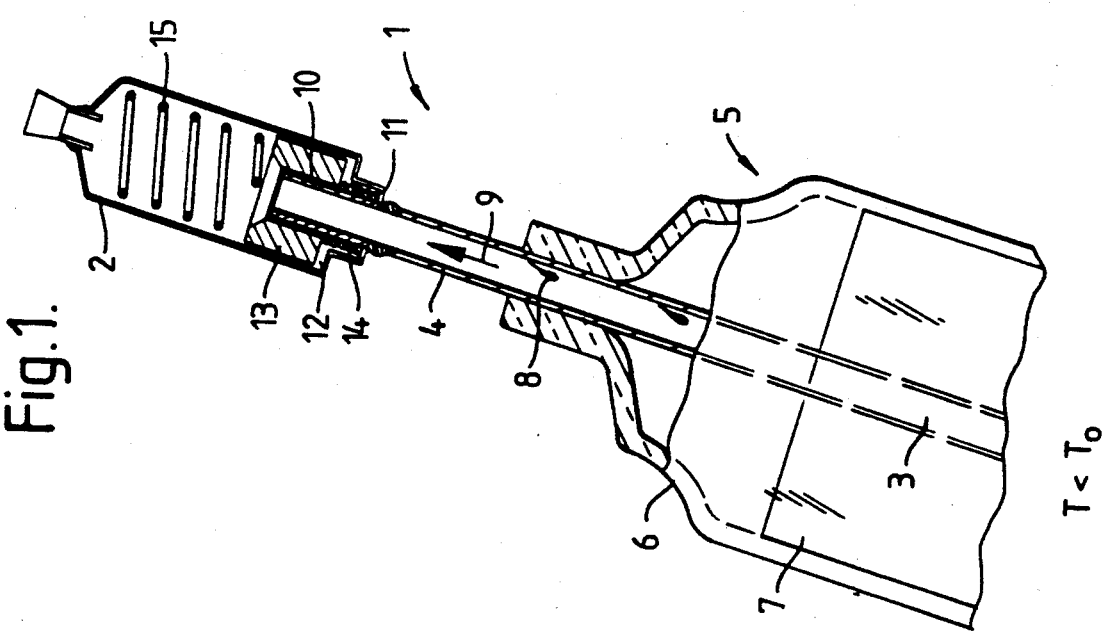

An embodiment of the present invention will now be described by way of example with reference to the accompanying drawing, in which:

FIG. 1 shows a heat pipe employed in a solar radiation collector in the configuration required when the temperature of the condenser is below the predetermined maximum temperature $T_o$; and FIG. 2 shows the heat pipe of FIG. 1 in the configuration required when the condenser temperature is greater than temperature $T_o$.

The heat pipe 1 contains a working fluid and comprises a condenser 2, an evaporator 3 and an interconnecting conduit or tube 4 which joins the evaporator and the condenser, (only the top portion of the evaporator is shown in the drawing). When used in a solar radiation collector, the evaporator 3 is provided with absorption apparatus 5, preferably of planar configuration, comprising a transparent jacket 6 such as a glass tube, the space 7 between the jacket and the evaporator preferably being evacuated to reduce conduction heat loss. The jacket may be provided with radiation absorbing fins (not shown), and is bonded to and in thermal contact with the evaporator which is formed from a closed-ended metal tube. The absorption apparatus preferably has low heat radiation properties.

In use, when the sun does not shine, the working fluid collects in the closed bottom end portion of the evaporator. Then, when the sun shines, the entire plate of the absorption apparatus and thus also the evaporator will be heated. The working fluid which is in the bottom end portion of the evaporator begins to vaporise and rises through the tube 4 in the direction of arrow 9 and into the condenser 2. The vapour transfers its heat to the condenser due to the condensation process, since the condenser is adapted to be received in a manifold (not shown) wherein a heat transferring fluid such as air or water is caused to flow. The exterior of the condenser is thus in direct contact with the heat transferring fluid in the manifold. The droplets 8 of condensed working fluid then fall back down the tube 4 and into the evaporator 3 to repeat the process.

As a result of the vacuum between the evaporator and the jacket and of the low heat radiation properties of the absorption apparatus, the heat losses of the solar radiation collector would be very low, and the temperature of the absorption apparatus might exceed 200° C. or even higher temperatures. Usually such a solar radiation collector would be used to produce a maximum usable temperature of up to 100° C. If the energy is not consumed, due to failure of the manifold circulating pump or to low heat consumption in the system (e.g. when no hot water is required), the temperature in the condenser may well exceed the desired 100° C. maximum temperature limit, or any other predetermined maximum temperature. In order to prevent any overheating and possible damage to or destruction of the condenser or the entire system, safety means have to be provided to limit the maximum temperature of the condenser.

Such a safety means is provided in the condenser as shown in the drawing. An overflow tube 10 extends upwardly from the base 11 of the condenser 2, thus creating a chamber or fluid reservoir 12 at the base of the condenser. An annular plug 13 is provided within the condenser, and when the temperature of the condenser is below the preselected temperature $T_o$ (as shown in FIG. 1) the plug is seated around the overflow tube 10 so that the plug fills almost the entire volume of the chamber or fluid reservoir 12. With the plug in this position, the condensed working fluid will return through the overflow tube 10 and down into the evaporator to continue the heat transfer process.

A helical spring 14 made of shape memory alloy, for example, is positioned between the base of the condenser and the plug 13. When the temperature of the condenser reaches $T_o$, the helical spring 14 moves the plug upwards away from the base of the condenser and out of the fluid reservoir 12 into the position shown in FIG. 2. The condensed working fluid will now be trapped in the fluid reservoir and can no longer return to the evaporator, so that once all the fluid is held in the reservoir 12 heat transfer ceases.

An additional helical compression spring 15 is provided between the plug and the top of the condenser, which assists in resetting the position of the plug when the temperature of the condenser falls below $T_o$ once more.

In alternative embodiments of the invention the helical shape memory alloy spring may be replaced by any other suitable temperature sensitive device such as a bimetal or a magnetic coupling actuated from outside the condenser.

I claim:

1. A solar radiation collector comprising a heat pipe containing a working fluid, the heat pipe comprising an evaporator, a condenser, an interconnecting tube joining the evaporator and the condenser, and a regulating means for automatically limiting the maximum temperature in the condenser to a predetermined temperature, said regulating means comprising a plug operable by means of a temperature sensitive member to move between a first position in which the plug seats in a fluid reservoir in said condenser and a second position in which said reservoir is adapted to collect the working fluid.

2. A solar radiation collector according to claim 1, wherein said fluid reservoir is formed by means of an overflow pipe which extends into the condenser from the base of said condenser.

3. A solar radiation collector according to claim 2, wherein the plug is an annular member adapted to fit slidingly over the overflow pipe.

4. A solar radiation collector according to claim 1, wherein the temperature sensitive member is made from a bimetal.

5. A solar radiation collector according to claim 4, wherein the temperature sensitive member is in the form of a helical spring which acts on the plug.

6. A solar radiation collector according to claim 5, wherein an additional helical spring is provided to reposition the plug to its first position when the temperature sensitive member reverts to its original setting.

7. A solar radiation collector according to claim 1, wherein the temperature sensitive member is made from a shape memory alloy.

8. A solar radiation collector according to claim 7, wherein the temperature-sensitive member is in the form of a helical spring which acts on the plug.

9. A solar radiation collector according to claim 8, wherein an additional helical spring is provided to reposition the plug to its first position when the temperature-sensitive member reverts to its original setting.

10. A solar radiation collector according to claim 7, having an absorption apparatus fitted around the evaporator and a secondary fluid circuit for removing heat from the condenser.

11. A solar radiation collector according to claim 1, having an absorption apparatus fitted around the evaporator and a secondary fluid circuit for removing heat from the condenser.

* * * * *